W. A. Peters, Jr., INVENTOR

BY HIS ATTORNEY

June 12, 1928.  W. A. PETERS, JR  1,673,374
RECTIFYING APPARATUS
Filed April 28, 1923   2 Sheets-Sheet 2
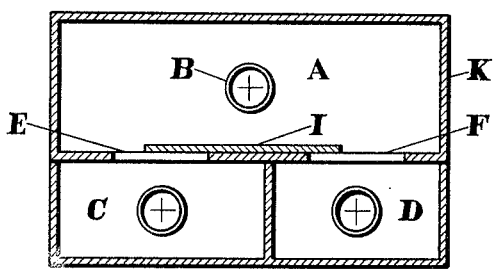
Fig.3
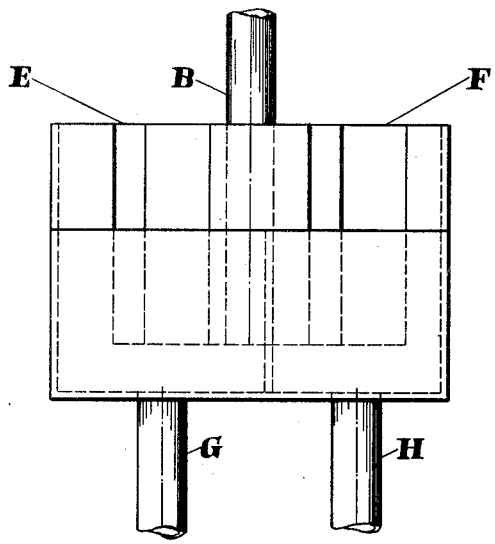   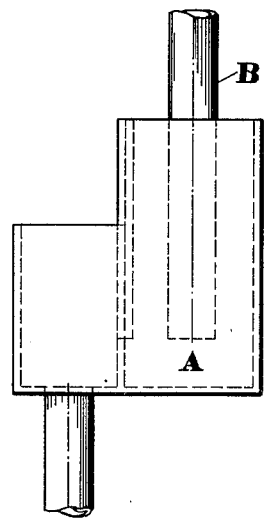
Fig.4   Fig.5
W.A.Peters,Jr., INVENTOR
BY HIS ATTORNEY Patented June 12, 1928.

1,673,374

UNITED STATES PATENT OFFICE.

WILLIAM A. PETERS, JR., OF WILMINGTON, DELAWARE, ASSIGNOR TO E. I. DU PONT DE NEMOURS & COMPANY, OF WILMINGTON, DELAWARE, A CORPORATION OF DELAWARE.

RECTIFYING APPARATUS.

Application filed April 28, 1923. Serial No. 635,339.

This invention relates to apparatus for automatically controlling the operation of a rectifying column in such a way that the column will furnish fluid distillate of constant composition at any desired rate.

It is frequently necessary to obtain a supply of a material at a variable rate by distillation where this material after distillation is dangerous or difficult to handle. For example, it may be desired to obtain ammonia gas. The storage of any quantity of the gas would require an expensive gas holder. An ordinary continuous still for stripping ammonia from water requires some attention, especially when it is to be operated at a variable rate or intermittently. By use of the present invention a gas holder is automatically kept full of ammonia gas regardless of the rate, below a certain maximum, at which this gas is used. Or a tank may be kept supplied with alcohol or any other distillate in the same manner.

Figure 1:
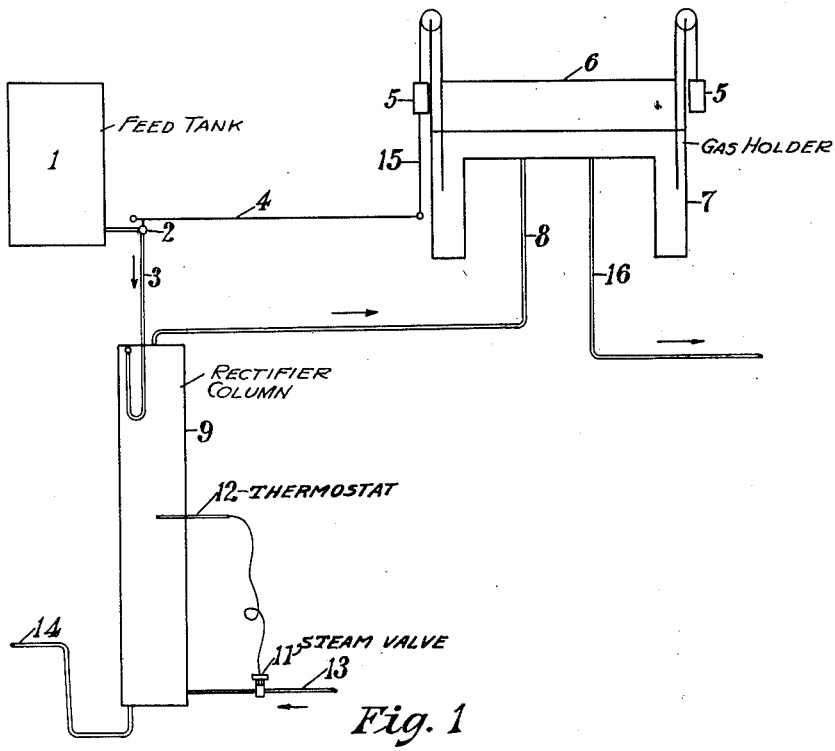
Figure 2:
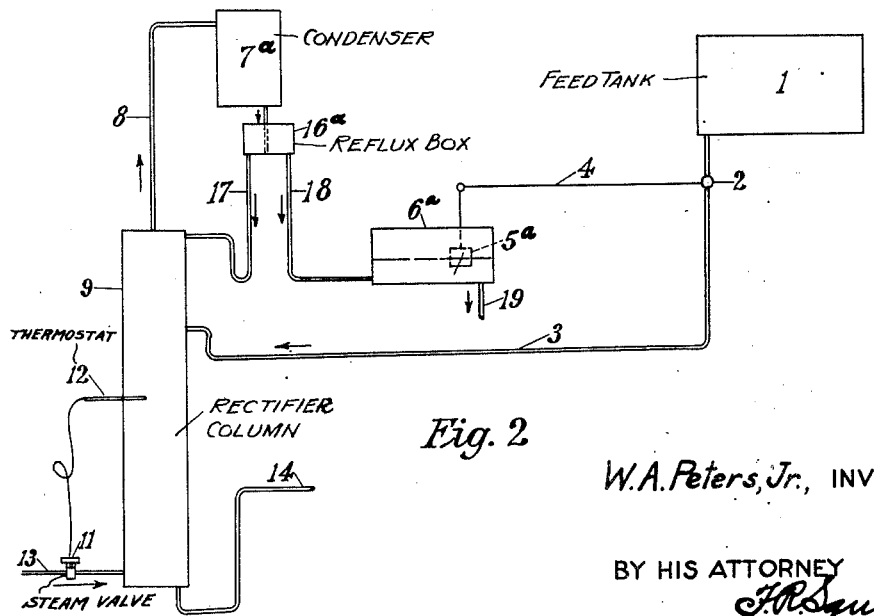

In the accompanying drawing, Fig. 1, a form of the apparatus to be used where the product of the distillation is a fluid such as a gas or vapor is illustrated; Fig. 2 shows an arrangement to be used if the fluid distillate is a liquid; Fig. 3 is a plan view of the reflux box; Fig. 4 is a front elevation, and Fig. 5 is a side elevation of the same.

Referring now to Fig. 1: Ammonia liquor of say 28% strength is stored in the feed tank 1. The ammonia gas temporarily stored in the gas holder 7 is supplied as desired through the line 16. The feed line 3 supplying ammonia liquor to the column 9 has valve 2 of any convenient form which is operated by the lever 4. This lever 4 is connected by the rod 15 to the weight 5 which balances the reservoir 6 of the gas holder. This arrangement of a valve and a lever may be varied without departing from the spirit of the invention. Several devices have been used such as a rubber hose connection which is pinched by the lever 4. Any means to control the flow from the tank 1 to the column 9, according to the height of the gas holder reservoir 6, may be employed.

The column 9 may be of any type but must be sufficiently efficient to deliver vapor of the desired composition through the line 8 and to completely strip the waste water passing out the trap 14 of all ammonia. In one case a column 5" in diameter and 8' high filled with glass rings 10 mm. in diameter by 10 mm. long was used. This column would deliver up to 35# per hr. of ammonia gas containing less than 10% water vapor when fed with liquor containing 25–28% ammonia.

The steam supply to the column through the line 13 is controlled by the thermostat 12 acting on the valve 11.

When the reservoir is full the valve 2 will be closed and no liquor will be fed to the column. The thermostat 12 is set to hold the center of the column at say 70°–80° C. As long as no fresh ammonia is introduced into the column, the valve 11 will pass just enough steam to keep the center of the column at this temperature. The top will of course remain cold and no vapor will pass to the gas holder. With a good thermostat of the Powers type, for instance, the column will remain in this balanced condition for days or weeks. As soon as any gas is withdrawn from the holder through the line 16, the valve 2 will start to open and ammonia will be fed to the column. The temperature at the thermostat will be lowered, causing the valve 11 to open and more steam to enter the base of the column. Ammonia gas is then driven over to the gas holder exactly as fast as it is withdrawn through the line 16.

The operation of the apparatus shown in Fig. 2 is practically the same as of that just described except that the distillate is a liquid instead of a gas. This distillate flows from the condenser 7ª to the reflux box 16ª which is described in my companion application Serial No. 635,338 filed April 28, 1923 (Case 4). By means of this reflux box a portion of the distillate is returned to the column through the line 17 and a portion is withdrawn through the line 18 to the reservoir tank 6ª. The float 5ª, controlling the lever 4, is actuated by the rise and fall of the liquid in the tank 6ª. As explained in said companion application, by means of this reflux box the ratio of liquid returned to the column to that run to storage is kept constant regardless of wide fluctuations in the amount or composition of the feed.

I claim:

1. The combination with a substantially vertical rectifier column for producing a fluid distillate, a steam supply means for said column, a thermostatic means for governing the amount of steam supplied to the column by the temperature at a point in said column, a supply tank for the liquid material to be distilled, a feed line connecting the supply tank with said column, a reservoir for the fluid distillate, a condenser communicating with said column at the upper portion thereof, a conduit communicating said condenser with said reservoir, a control mechanism in the feed line adapted to be actuated by variations in the quantity of fluid distillate in said reservoir in such a way that when the supply of fluid in the reservoir becomes depleted the amount of liquid supplied to the column is increased and when the reservoir becomes full the liquid supplied to the column is decreased.

2. In a rectifying assembly, in combination, a substantially vertical rectifier column, a steam supply means for the column, a thermostatic control mechanism coupling the column and steam supply means adapted to thermostatically control the steam supply to the column by the temperature at a point in the column, a condenser communicating with said column at the upper part thereof, a distillate storage reservoir, means connected to said condenser and having conduits leading to the column and to the storage reservoir, said means adapted to fix the ratio of distillate refluxed to the column to that withdrawn to the storage reservoir, a feed line for liquid to be fed to the column to be rectified, a control valve in said line, a float in the distillate reservoir, and mechanism operatively connecting the float and control valve and adapted to open or close said valve upon fall or rise of said float.

In testimony whereof I affix my signature.

WILLIAM A. PETERS, Jr.